(12) United States Patent
Heck et al.

(10) Patent No.: US 8,602,697 B1
(45) Date of Patent: Dec. 10, 2013

(54) MACHINING APPARATUS WITH REDUCED CUTTER VIBRATIONS

(75) Inventors: David P. Heck, Saint Charles, MO (US); Randolph B. Hancock, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 1008 days.

(21) Appl. No.: 12/499,447

(22) Filed: Jul. 8, 2009

(51) Int. Cl.
*B23C 3/00* (2006.01)

(52) U.S. Cl.
USPC ............ 409/132; 408/1 R; 408/143; 408/202; 74/572.2

(58) Field of Classification Search
USPC ................. 408/143, 202, 226, 1 R; 74/572.2, 74/572.21, 573.1, 573.11, 573.12, 573.13, 74/574.1, 574.2, 574.3, 574.4; 409/131, 409/132

See application file for complete search history.

(56) References Cited

U.S. PATENT DOCUMENTS

| | | | | |
|---|---|---|---|---|
| 2,371,089 | A * | 3/1945 | Weddell | 409/64 |
| 5,311,654 | A * | 5/1994 | Cook | 29/447 |
| 6,345,942 | B1 * | 2/2002 | Cook | 409/131 |

FOREIGN PATENT DOCUMENTS

| | | | | |
|---|---|---|---|---|
| DE | 3733533 | A1 | * | 4/1989 |
| JP | 08323573 | A | * | 12/1996 |
| JP | 10337605 | A | * | 12/1998 |
| JP | 11010423 | A | * | 1/1999 |
| JP | 2001246530 | A | * | 9/2001 |
| JP | 2002200538 | A | * | 7/2002 |
| JP | 2004322236 | A | * | 11/2004 |
| JP | 2006305704 | A | * | 11/2006 |
| JP | 2008264978 | A | * | 11/2008 |

OTHER PUBLICATIONS

JPO Machine Translation—Akazawa, Koichi. (Nov. 2008). Japan Publication No. JP 2008264978 A.*
JPO Machine Translation—Ueno et al. (Nov. 2006). Japan Publication No. JP 2006305704 A.*
JPO Machine Translation—Hasegawa, Masako. (Nov. 2004). Japan Publication No. JP 2004322236 A.*
JPO Machine Translation—Kiyota, Shinichi. (Jul. 2002). Japan Publication No. JP 2002200538 A.*
JPO Machine Translation—Mizoguchi, Haruki. (Sep. 2001). Japan Publication No. JP 2001246530 A.*
JPO Machine Translation—Okuno et al. (Jan. 1999). Japan Publication No. JP 11010423 A.*
JPO Machine Translation—Watanabe et al. (Dec. 1998). Japan Publication No. JP 10337605 A.*
JPO Machine Translation—Kaneko, Koichi. (Dec. 1996). Japan Publication No. JP 08323573 A.*
EPO Machine Translation—(Apr. 1989). Germany Publication No. DE 3733533 A1.*

(Continued)

*Primary Examiner* — Daniel Howell
*Assistant Examiner* — Michael Vitale
(74) *Attorney, Agent, or Firm* — Yee & Associates, P.C.

(57) ABSTRACT

In one advantageous embodiment, an apparatus may comprise a housing having a first end, a second end, and a number of dimensions. Also, the apparatus may comprise a inner cylinder extending through the housing from the first end to the second end in which the inner cylinder is configured to receive a tool at the first end and is configured to a engage a tool holder at the second end in which the number of dimensions of the housing is configured to reduce vibrations during a machining operation.

24 Claims, 4 Drawing Sheets

(56) References Cited

OTHER PUBLICATIONS

Young et al., "Requirements for Consistent and Productive Performance in High Speed Milling", IMECE 2003-41694, Proceedings of IMECE 2003 ASME Mechanical Engineering Congress Exposition, Nov. 2003, Washington DC, pp. 1-8.

Duncan et al., "An Investigation of the Dynamic Absorber Effect in High-Speed Machining", Proceedings of the 17th ASPE Annual Meeting, Oct. 26-31, Portland Oregon, 4 pages.

* cited by examiner

MACHINING APPARATUS WITH REDUCED CUTTER VIBRATIONS

BACKGROUND INFORMATION

1. Field

The present disclosure relates generally to manufacturing, and in particular, to a method and apparatus for machining and cutting materials. Still more particularly, the present disclosure relates to a method and apparatus for reducing cutter vibration during a machining operation.

2. Background

Manufacturing may involve the use of tools and/or labor to create items for use or sale. In aerospace manufacturing, these items may include, for example, without limitation, aircraft, aircraft parts, missiles, rockets, and/or spacecraft. In manufacturing various items, a number of different operations may be performed. The number of different operations may include, for example, without limitation, milling, machining, extrusion, pressing, rolling, piercing, machining, drilling, routing, cutting, and curing.

With respect to machining, a machine tool may be used with a tool such as a cutting tool to cut a workpiece to a desired geometry. The machine tool may be, without limitation, a lathe, milling machine, drill press, and/or some other type of machine tool. A machine tool may be used to perform a number of different operations. The number of different operations may include, for example, without limitation, turning, drilling, boring, milling, shaping, planning, broaching, and sawing. During turning, a cutting tool may be used to remove material from a rotating workpiece to generate a cylindrical shape. During drilling, a round hole may be created from a rotating cutting tool. During boring, a cutting tool may be used to enlarge an already formed hole in the workpiece. During milling, a rotating tool with multiple cutting edges is moved relative to the material to generate a substantially planar or substantially straight surface.

With respect to milling, a milling machine may be used to shape a workpiece. A workpiece may have a number of different layers of materials such as, but not limited to, a metal or other solid material. A milling machine may perform slot and keyway cutting, planing, drilling, and/or routing. Milling machines may comprise a spindle and milling cutter. The milling cutter may be held in the spindle and rotate on an axis. There may be many types of milling cutters such as, but not limited to, an end mill, slot drill, roughing end mill, ball nose cutter, and/or other types of milling cutters.

Milling machines may be used to cut and shape workpieces that may have different sizes, thicknesses, shapes, materials and other features with different depths. Currently, when milling a flat workpiece, a short cutter may be used. Conversely, when milling into a material with a large recess, a long cutter may be required. While cutters are in operation they experience vibrations. Vibrations may cause chatter marks and/or cutter walking. Chatter marks may be when the vibrations cause the sides of the cutter to rub against the material. Cutter walking may occur when the vibrations cause the tip of the cutter to move from the desired machining location on the material. Cutter walking and chatter marks may cause unwanted defects in the materials and may require manual correction by hand.

Furthermore, when milling different sizes and shapes of workpieces, different cutter lengths may be used. Using different length cutters causes a loss in time due to switching out different cutting tool assemblies. Furthermore, long slender cutting tools for deep recess milling may be expensive and may sometimes be custom made. These custom made cutters may be even more expensive.

With respect to drilling, a drill may be used to create holes or channels that may be cylindrical in a workpiece. A drill may be a tool with a rotating section that may hold a drill bit to drill holes. A drill bit may be a cutting tool that may be used to create holes in a workpiece. These holes may be cylindrical or non-cylindrical depending on the particular implementation. Drilling may involve drilling a channel, such as, for example, without limitation, a cylindrical hole.

Therefore, it would be advantageous to have a method and apparatus that takes into account the issues described above as well as possible other issues.

SUMMARY

In one advantageous embodiment, a method for performing a machining operation may comprise positioning a tool having a collar in which the tool may be connected to a tool holder in which positioning may be relative to a machining area on a workpiece. Then, a tool may be rotated.

In another advantageous embodiment, a method for reducing vibration in a tool may comprise altering the temperature of a collar to increase an inner diameter of an inner cylinder to be larger than an outer diameter of a cutter, the collar comprising a housing and the inner cylinder in which the inner diameter of the inner cylinder may be smaller than the outer diameter of the cutter, the housing may have a cross section with a shape of a circle. Then, a cutter may be inserted through the inner cylinder of the collar. Next, the cutter and collar may be allowed to cool, thereby creating a clamping force between the cutter and the collar. Next, the collar in which the cutter may be connected to a cutter holder may be positioned in which positioning may be relative to a machining area on a workpiece. Next, a cutter and collar may be rotated. Vibrations in the cutter may be reduced due to the collar shortening the unsupported length of the cutter. Finally, the cutter may be contacted with the workpiece at a machining area in which the workpiece may be made of at least one of titanium, aluminum, and steel, and the collar may reduce vibration of the cutter while rotating with the cutter.

In one advantageous embodiment, an apparatus may comprise a housing having a first end, a second end, and a number of dimensions in which the number of dimensions of the housing is configured to reduce vibrations of a tool during a machining operation. Also, the apparatus may comprise a inner cylinder extending through the housing from the first end to the second end in which the inner cylinder is configured to receive the tool at the first end and is configured to engage a tool holder at the second end.

In another advantageous embodiment, an apparatus may comprise a housing having a first end, a second end, a number of dimensions, a length, an outer diameter, and an exterior surface, the length and the outer diameter of the housing may be selected such that vibration of the tool during a machining operation is reduced by shortening the unsupported length of the tool, and the number of dimensions having a cross section with a shape of a circle. The apparatus may also comprise an inner cylinder, concentric with and extending through the housing from the first end to the second end in which the channel is configured to receive a tool at the first end and is configured to engage a tool holder at the second end in which an inner diameter of the inner cylinder is less than an outer diameter of the tool, and the housing and the inner cylinder forming a collar and further comprising: the tool holder in which the apparatus may be flush against the tool holder and a spindle system connected to the tool holder in which the spindle may be configured to rotate the tool holder. The apparatus may also comprise a machining apparatus in which the spindle system may be located in the machining apparatus. An outer surface extending from the second end to the first end, the second end being an inner radial position adjacent to the tool holder, the outer surface diameter tapering from the second end to the first end, and the first end being an outer radial position coexistent with an exterior surface of the housing on a distal end of the housing for engaging a machining area on a workpiece.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
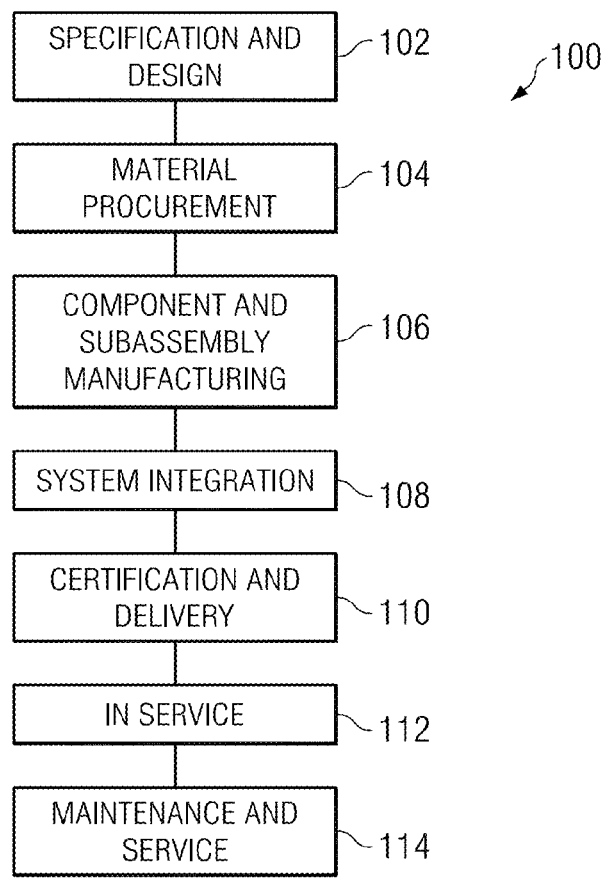
FIG. 1 is a diagram illustrating an aircraft manufacturing and service method in which an advantageous embodiment may be implemented.
Figure 2:
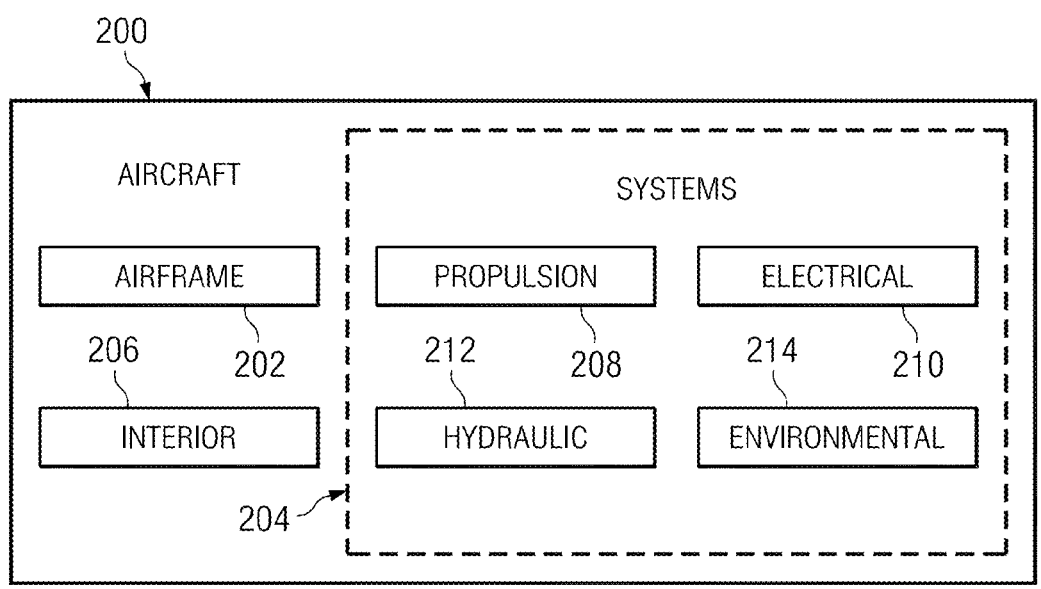
FIG. 2 is a diagram illustrating an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 may be produced by aircraft manufacturing and service method 100 in FIG. 1 and may include airframe 202 with systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 may be in service 112 or during maintenance and service 114 in FIG. 1.

The different advantageous embodiments recognize and take into account that the apparatuses and method described herein may be used during a manufacturing and service method for trucks, cars, boats, tanks, military vehicles, buildings, spacecraft, any type of vehicle, and any process where machining, milling, or drilling may be applicable.

The different advantageous embodiments recognize and take into account that different length and types of machining apparatuses may be needed for drilling, boring, milling, and shaping workpieces with different shapes, thicknesses, sizes, materials, and other features. The different advantageous embodiments recognize and take into account that these different machining apparatuses may have vibrations in their cutting tools. The different advantageous embodiments also recognize and take into account that vibrations in cutters may cause chatter marks and cutter walking.

The different advantageous embodiments recognize and take into account that different machining apparatuses may not have an ideally shaped tool holder for cutting a workpiece with a specific size and shape. The different advantageous embodiments recognize and take into account that the less ideal the fit, the more vibrations may occur.

Thus, the different advantageous embodiments may provide an apparatus comprising a housing having a first end, a second end, and a number of dimensions. Also, the apparatus may comprise a inner cylinder extending through the housing from the first end to the second end in which the inner cylinder may be configured to receive a tool at the first end and may be configured to a engage a tool holder at the second end in which the number of dimensions of the housing may be configured to reduce vibrations during a machining operation.

Figure 3:
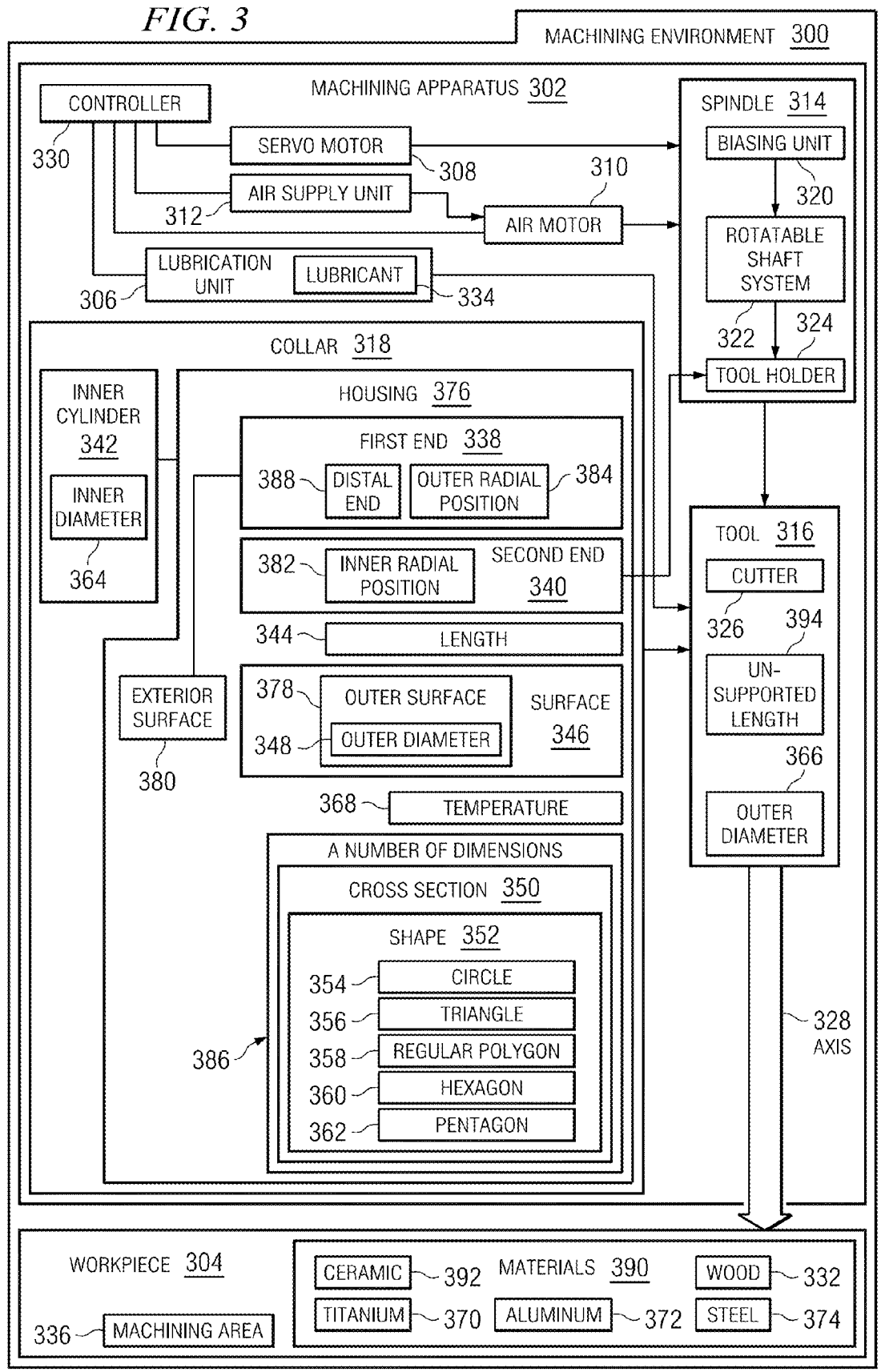
FIG. 3 is an illustration of a machining environment in accordance with an advantageous embodiment.

With reference now to FIG. 3, a diagram of a machining environment is depicted in accordance with an advantageous embodiment. Machining environment 300 may comprise machining apparatus 302 and workpiece 304. Machining environment 300 may be implemented during service method 100 of FIG. 1. Machining environment 300 may be used on aircraft 200 of FIG. 2. For example, machining environment 300 may be used during at least component and subassembly manufacturing 106 of FIG. 1 to shape parts of airframe 202 of FIG. 2.

Machining apparatus 302 may include controller 330, air supply unit 312, lubrication unit 306, air motor 310, spindle 314, collar 318, servo motor 308, and tool 316.

Tool 316 may be attached to spindle 314. Spindle 314 may be attached to air motor 310. Air motor 310 may cause spindle 314 to rotate, which in turn may rotate tool 316 to shape workpiece 304. Spindle 314 includes biasing unit 320, rotatable shaft system 322, and tool holder 324. Tool holder 324 may hold tool 316. Tool 316 may take the form of cutter 326 in these examples. In other examples, tool 316 may take the form of a drill bit. Biasing unit 320 may move rotatable shaft system 322 and tool holder 324 along the direction of the axis 328. In this manner, biasing unit 320 may cause spindle 314 to move axially along axis 328. Rotatable shaft system 322 may rotate tool 316 around axis 328.

Biasing unit 320 may provide a mechanism to move spindle 314 back and forth with tool 316 along axis 328 to perform various operations. These operations include, for example, without limitation, turning, drilling, boring, milling, shaping, planing, broaching, sawing, and other suitable operations.

Workpiece 304 may comprise any number and combination of types of materials 390 such as, but not limited to, aluminum 372, steel 374, titanium 370, wood 332, ceramic 392, and any other type of material or combination of materials.

Biasing unit 320 may be implemented using any mechanism that moves tool 316 along axis 328. In these examples, biasing unit 320 may take the form of a ball screw mechanism that has a nut and screw. Biasing unit 320 may be controlled by air motor 310. Air motor 310 may operate biasing unit 320 to perform the different machining operations.

Rotatable shaft system 322 may be implemented using any mechanism that can rotate tool holder 324 about axis 328 and move axially along axis 328. Rotatable shaft system 322 may include, for example, without limitation, a ball spine, a mechanical spine, a gearing mechanism, a keyed shaft, or other suitable devices to transfer torque and/or rotation to spindle 314.

In these examples, the torque and/or rotation may be generated by air motor 310. Air motor 310 may rotate rotatable shaft system 322. The speed at which rotatable shaft system 322 turns may vary depending on the air supplied to air motor 310 by air supply unit 312. By changing the amount of air supplied by air supply unit 312, air motor 310 may turn rotatable shaft system 322 at different speeds.

In these examples, lubrication unit 306 may provide lubricant 334 to tool 316. In turn, lubricant 334 may be applied to machining area 336 by tool 316 during machining operations.

In these examples, controller 330 may control air supply unit 312, biasing unit 320, and/or lubrication unit 306. Controller 330 may increase the air supply from air supply unit 312 to air motor 310, which in turn may speed up spindle 314.

In an advantageous embodiment, machining apparatus 302 may comprise collar 318. Collar 318 may cause vibrations of tool 316 to decrease. Tool 316 may have unsupported length 394. Unsupported length 394 is the length of tool 316 that may be uncovered. The longer unsupported length 394, the more susceptible tool 316 may be to bending. The more susceptible tool 316 is to bending, the more susceptible tool 316 may be to vibrations while being rotated. The vibrations may occur when tool 316 is contacted with workpiece 304.

Collar 318 may comprise housing 376, temperature 368, and inner cylinder 342. Collar 318 may be configured to be placed on tool 316.

Inner cylinder 342 may describe a hole through housing 376. Inner cylinder 342 may extend through housing 376 from first end 338 to second end 340. First end 338 may comprise distal end 388 and outer radial position 384. Distal end 388 and outer radial position 384 may be on the side of housing 376 opposite from tool holder 324. The side of housing 376 furthest from tool holder 324 may comprise exterior surface 380. Second end 340 may comprise inner radial position 382. Inner radial position 382 may be on the side of housing 376 nearest tool holder 324. Inner cylinder 342 may be configured to receive tool 316 at first end 338. Also, inner cylinder 342 may be configured to engage tool holder 324 at second end 340. Inner cylinder 342 may comprise inner diameter 364.

Temperature 368 of collar 318 may be altered to place collar 318 on tool 316. Temperature 368 of collar 318 may be heated to result in thermal expansion of collar 318, causing inner diameter 364 of inner cylinder 342 to expand. When inner diameter 364 of inner cylinder 342 may be larger than outer diameter 366 of tool 316, collar 318 may fit onto tool 316. When temperature 368 of collar 318 returns to normal, collar 318 may fit tightly around tool 316. Temperature 368 may return to normal when temperature 368 is substantially equal to the temperature before temperature 368 was altered. In different advantageous embodiments, a temperature of tool 316 may be altered or the temperature of both collar 318 and tool 316 may be altered. The different advantageous embodiments may recognize that currently available machining tools may not include collar 318. Additionally, in different advantageous embodiments, the material of collar 318, tool 316, or both, may be chosen to control the thermal expansion as different materials expand at different temperatures.

Housing 376 may describe the physical portion of collar 318. Housing 376 may comprise first end 338, second end 340, length 344, surface 346, outer diameter 348, and a number of dimensions 386. First end 338 and second end 340 may be opposite from each other and located on each side of housing 376 that comprises an opening of inner cylinder 342. Outer diameter 348 of housing 376 may be a diameter to outer surface 378 of housing 376. A number of dimensions 386 may be an area of housing 376 between surface 346 and inner cylinder 342. In one advantageous embodiment, first end 338 may be configured to receive inner cylinder 342 and second end 340 may be configured to engage tool holder 324. In one advantageous embodiment, second end 340 may be flush against tool holder 324. In other advantageous embodiments, second end 340 may be separated from tool holder 324.

A number of dimensions 386 may comprise cross section 350. Cross section 350 may comprise shape 352. Shape 352 of cross section 350 may be, but not limited to, circle 354, triangle 356, regular polygon 358, hexagon 360, or pentagon 362. In one advantageous embodiment, when shape 352 may comprise circle 354, outer diameter 348 of housing 376 may decrease from second end 340 to first end 338. In another advantageous embodiment, housing 376 has surface 346 which may taper from second end 340 to first end 338 to form outer surface 378.

The illustration of machining apparatus 300 in FIG. 3 is provided for demonstrating different features of the different advantageous embodiments. The illustration of machining apparatus 300 is not intended to imply physical or architectural limitations to the manner in which machining apparatus 300 may be implemented. For example, without limitation, in other advantageous embodiments, machining apparatus 300 may use an electric motor instead of air motor 310.

The illustration of machining environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks may be presented to illustrate some functional components. One or more of these blocks may be combined and/or divided into different blocks when implemented in different advantageous embodiments. For example, lubrication unit 306 and controller 330 may be attached to each other in a single housing or may be located in separate housings.

In other advantageous embodiments, machining apparatus 300 may be used to shape other types of materials 390 other than aluminum 372, titanium 370, steel 374, wood 332, and ceramic 392. For example, without limitation, machining apparatus 300 may be used to shape layers of materials such as, for example, without limitation, ceramic, metal alloys, other types of composite materials, and other suitable materials.

Additionally, workpiece 304 may be, for example, without limitation, a wing joint, a skin panel and support structure, a skin panel in a rib, a solar panel, and/or some other suitable part or set of parts.

Figure 4:
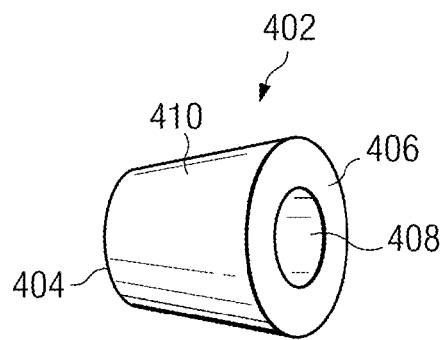
FIG. 4 is a diagram illustrating a collar in accordance with an advantageous embodiment.

With reference now to FIG. 4, a diagram illustrating a collar in accordance with an advantageous embodiment. Collar 402 may be one implementation of one advantageous embodiment of collar 318 of FIG. 3. Collar 402 may comprise first end 404, second end 406, inner cylinder 408, and surface 410. Surface 410 of collar 402 may be tapered to allow clearance into different regions of a workpiece, such as a recessed region. In different advantageous embodiments, collar 402 may comprise different shapes that facilitate insertion into different regions of a workpiece. Inner cylinder 408 may retain a constant inner diameter through collar 402 allowing a cutting tool with a constant outer diameter to fit through collar 402.

Figure 5:
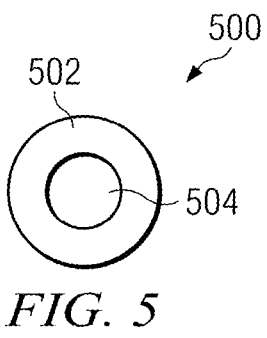
FIG. 5 is a diagram illustrating a first end of a collar in accordance with an advantageous embodiment.

With reference now to FIG. 5, a diagram illustrating a first end of a collar in accordance with an advantageous embodiment. Collar 500 may be one implementation of one advantageous embodiment of collar 318 of FIG. 3. Collar 500 may comprise second end 502 and inner cylinder 504. Inner cylinder 504 may be the same inner cylinder as inner cylinder 342 of FIG. 3 and/or inner cylinder 408 of FIG. 4.

Figure 6:
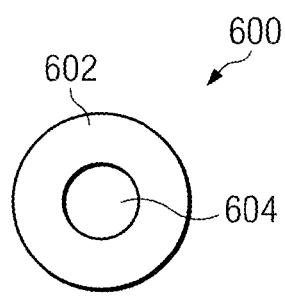
FIG. 6 is a diagram illustrating a second end of a collar in accordance with an advantageous embodiment.

With reference now to FIG. 6, a diagram illustrating a second end of a collar in accordance with an advantageous embodiment. Collar 600 may be one implementation of one advantageous embodiment of collar 318 of FIG. 3. Collar 600 may comprise first end 602 and inner cylinder 604. Inner cylinder 604 may be the same inner cylinder as inner cylinder 342 of FIG. 3, inner cylinder 408 of FIG. 4, and/or inner cylinder 504 of FIG. 5.

Figure 7:
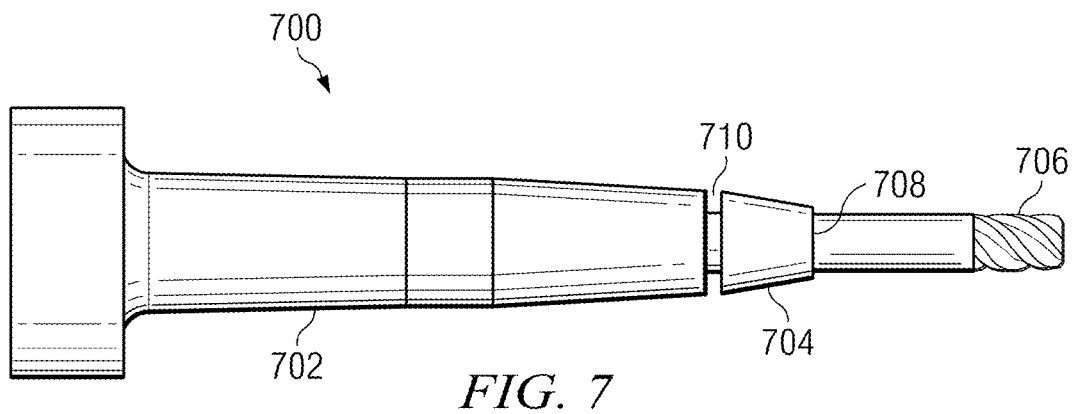
FIG. 7 is a diagram illustrating a machining apparatus in accordance with an advantageous embodiment.

With reference now to FIG. 7, a diagram illustrating a machining apparatus in accordance with an advantageous embodiment. Machining apparatus 700 may be one implementation of one advantageous embodiment of machining apparatus 302 of FIG. 3. Machining apparatus 700 may comprise tool holder 702, collar 704, and tool 706. Tool holder 702 may be one implementation of tool holder 324 of FIG. 3. Collar 704 may be one implementation of collar 318 of FIG. 3. Tool 706 may be one implementation of tool 316 of FIG. 3. Collar 704 may comprise first end 708 and second end 710. Collar 704 may be tapered to allow clearance into different regions of a workpiece, such as a recessed region. In different advantageous embodiments, collar 704 may comprise different shapes that facilitate insertion into different regions of a workpiece.

Figure 8:
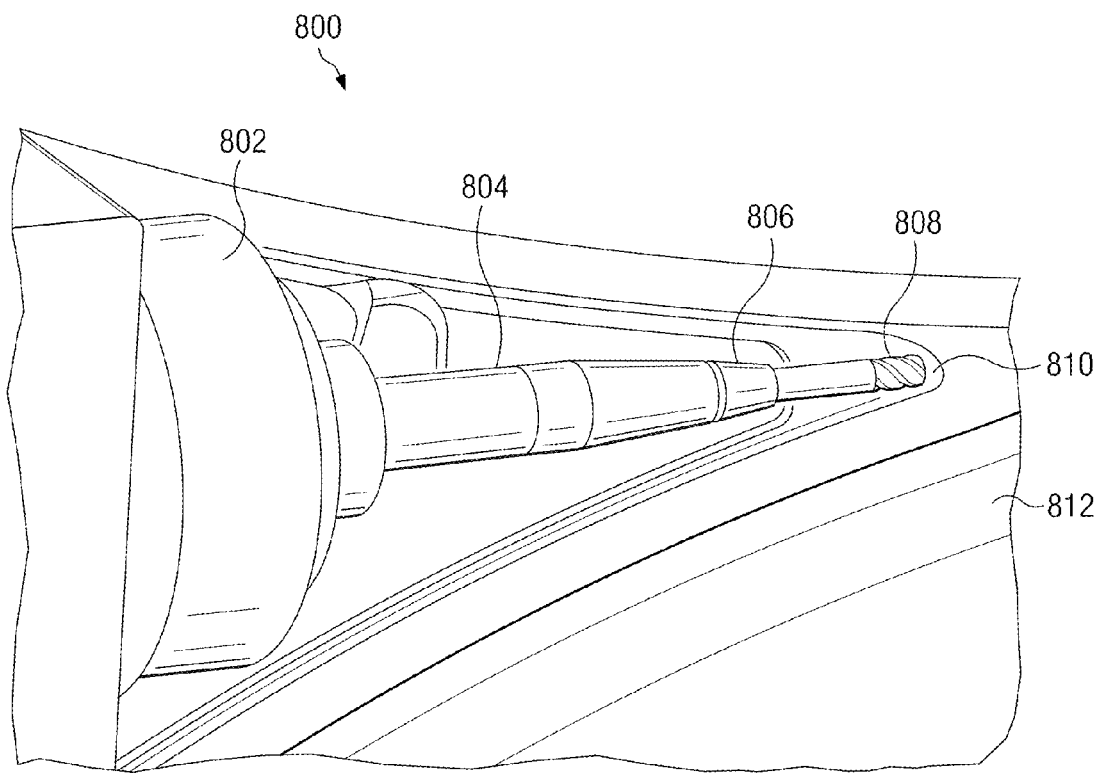
FIG. 8 is a diagram illustrating a machining apparatus operating on a workpiece in accordance with an advantageous embodiment.

With reference now to FIG. 8, a diagram illustrating a machining apparatus operating on a workpiece in accordance with an advantageous embodiment. Machining apparatus 800 may be one implementation of one advantageous embodiment of machining apparatus 302 of FIG. 3. Machining apparatus 800 may comprise spindle 802, tool holder 804, collar 806, and tool 808. Spindle 802 may be one implementation of spindle 314 of FIG. 3. Tool holder 804 may be one implementation of tool holder 324 of FIG. 3. Collar 806 may be one implementation of collar 318 of FIG. 3. Tool 808 may be one implementation of tool 316 of FIG. 3. Workpiece 812 may be one implementation of one advantageous embodiment of workpiece 304 of FIG. 3. Workpiece 812 may comprise machining area 810. In one or more advantageous embodiment, machining area 810 may be a recessed region of workpiece 812. Collar 806 may be tapered to allow clearance into different regions of workpiece 812, such as a recessed region. In different advantageous embodiments, collar 806 may comprise different shapes that facilitate insertion into different regions of workpiece 812.

Figure 9:
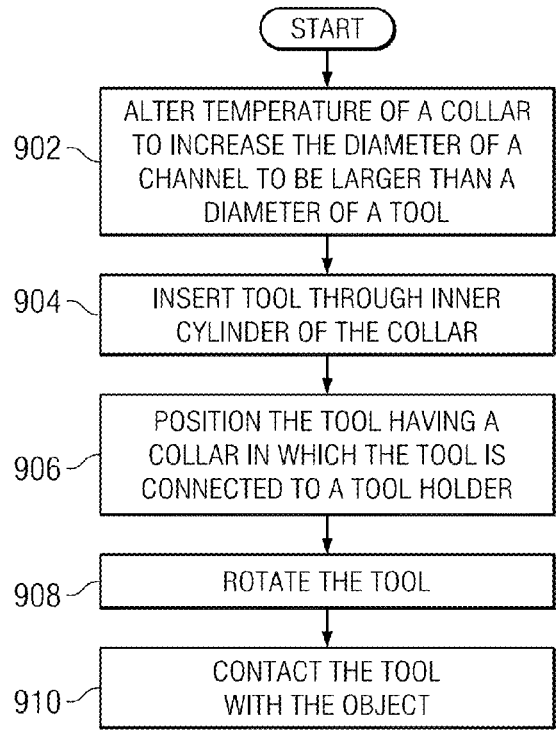
FIG. 9 is an illustration of a flowchart of a machining operation in accordance with an advantageous embodiment.

With reference now to FIG. 9, a flowchart of a process for performing a machining operation in accordance with an advantageous embodiment. This process may be one implementation of one embodiment in component and subassembly manufacturing 106 and/or maintenance and service 114 of FIG. 1. In this illustrative embodiment, the process may be implemented using machining apparatus 302 in machining environment 300 in FIG. 3.

The process may begin by altering temperature 368 of collar 318 to increase inner diameter 364 of inner cylinder 342 to be larger than outer diameter 348 of tool 316 (operation 902). Increasing temperature 368 of collar 318 may cause thermal expansion, which in turn, may cause an increase in inner diameter 364 of the inner cylinder 342. Collar 318 may comprise housing 376 and inner cylinder 342 in which inner diameter 364 of inner cylinder 342 may be smaller than outer diameter 348 of tool 316. Tool 316 may be cutter 326. Housing 376 may have cross section 350 with shape 352 selected from one of circle 354, triangle 356, regular polygon 358, hexagon 360, pentagon 362, and/or some other type of shape. Next, tool 316 may be inserted through inner cylinder 342 of collar 318 (operation 904).

In operation 904, tool 316 may be inserted through inner cylinder 342 once thermal expansion has caused inner diameter 364 of inner cylinder 342 to be larger than outer diameter 366 of tool 316. Temperature 368 may then be allowed to decrease, allowing inner diameter 364 of inner cylinder 342 to decrease. Once inner diameter 364 of the inner cylinder 342 decreases, collar 318 may firmly fit around tool 316. Different advantageous embodiments recognize that alternatively, the temperature of tool 316 may be decreased to allow insertion through collar 318 or temperature 368 of collar 318 may be increased and the temperature of tool 316 may be decreased.

Tool 316 having collar 318 in which tool 316 is connected to tool holder 324 may then be positioned in which positioning may be relative to machining area 336 on workpiece 304 (operation 906). Next, tool 316 may be rotated (operation 908). Then, tool 316 may be contacted with workpiece 304 (operation 910). Workpiece 304 may be made of at least one of titanium 370, aluminum 372, steel 374, wood 332, ceramic 392, and/or some other material. A number of advantageous embodiments recognize that collar 318 may reduce vibration of tool 316 while rotating tool 316. Collar 318 may reduce vibrations by decreasing unsupported length 394 or uncollared length of tool 316. The shorter unsupported length 394 of tool 316, the less tool 316 may bend.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, different components of spindle 314 of FIG. 3 may instead be in different orders and/or not located on spindle 314 of FIG. 3. As another example, rotatable shaft system 322 of FIG. 3 may be combined with tool holder 324 of FIG. 3 to form one component.

Additionally, it may be understood that using an air motor does not preclude, and may specifically include, the use of other types of motors, including but not limited to, electric, gas, gasoline, solar, and/or some other type of motor.

A number of advantageous embodiments provide a collar for a cutter to reduce vibrations. Vibrations may also be referred to as tool deflections. The collar may reduce vibrations by decreasing the unsupported length of a cutting tool. The shorter the unsupported length of the cutting tool, the less the cutting tool may bend. The different advantageous embodiments provide different sizes and shapes of collars so that there may not be a need to an entirely new length of cutter. The different advantageous embodiments provide different length collars so that a single length cutter may be used on varying workpiece recesses.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected may be chosen and described in order to best explain the principles of the embodiments, the practical application, and to enable others of ordinary skill in the art to understand the disclosure for various embodiments with various modifications as may be suited to the particular use contemplated.

Further, different advantageous embodiments may provide different advantages as compared to other advantageous embodiments. The embodiment or embodiments selected may be chosen and described in order to best explain the principles of the embodiments, the practical application, and to enable others of ordinary skill in the art to understand the disclosure for various embodiments with various modifications as may be suited to the particular use contemplated.

What is claimed is:

1. A method for performing a machining operation on a workpiece having an elongated, recessed region, the method comprising:
    fitting a collar on a tool by heating the collar to a higher temperature than the tool, placing an unsupported region of the tool through an inner cylinder of the collar, and allowing the collar to cool and firmly fit the tool, the collar having a surface that tapers from a second end to a first end, the tool and the collar having an elongated configuration;
    positioning the tool having the collar relative to a machining area on the workpiece, the machining area being the elongated, recessed region, wherein the tool and the collar enter the elongated, recessed region, the collar positioned to reduce vibrations of the tool during the machining operation; and
    rotating the tool to perform the machining operation, a length and an outer diameter of the collar configured to shorten an unsupported length of the tool thereby reducing vibrations of the tool during the machining operation.

2. The method of claim 1, wherein the collar comprises a housing and the inner cylinder in which an inner diameter of the inner cylinder is smaller than an outer diameter of the tool at a first temperature and the inner diameter of the inner cylinder is larger than the outer diameter of the tool at a higher temperature.

3. The method of claim 2, further comprising:
    altering a temperature of the collar to increase the inner diameter of the inner cylinder to be larger than the outer diameter of the tool;
    inserting the tool through the inner cylinder of the collar; and
    allowing the temperature to return to an unaltered state creating a clamping force between the collar and the tool.

4. The method of claim 1, wherein the tool is attached to a tool holder, and wherein the collar is separated from the tool holder.

5. The method of claim 1, further comprising:
    contacting the tool with the workpiece and performing a milling operation on the workpiece.

6. The method of claim 1, wherein the workpiece is made of at least one of titanium, aluminum, and steel.

7. The method of claim 1, wherein a housing of the collar has a cross section with a shape selected from one of a circle, a triangle, a regular polygon, a hexagon, or a pentagon.

8. The method of claim 1, wherein the tool comprises a milling end cutter.

9. The method of claim 1, wherein vibrations in the tool are reduced due to the collar shortening an unsupported length of the tool.

10. A method for reducing vibration in a milling cutter while milling on a work piece having an elongated recessed region, the method comprising:
    altering a temperature of a metal collar to increase an inner diameter of an inner cylinder of the metal collar to be larger than an outer diameter of the milling cutter, the metal collar comprising a housing and the inner cylinder in which the inner diameter of the inner cylinder is smaller than the outer diameter of the milling cutter, the housing having a cross section with a shape of a circle;
    inserting the milling cutter through the inner cylinder of the metal collar;

allowing the temperature to return to an unaltered state creating a clamping force between the metal collar and the milling cutter, thereby firmly fitting the inner cylinder to the milling cutter;

positioning the milling cutter having the metal collar proximate to a machining area on the workpiece, the milling cutter connected to a cutter holder;

rotating the milling cutter, a length and an outer diameter of the metal collar configured such that vibrations in the milling cutter are reduced due to the metal collar shortening an unsupported length of the cutter; and contacting the milling cutter with the workpiece at the machining area, the workpiece made of at least one of titanium, aluminum, and steel, and the metal collar reducing vibration of the milling cutter while rotating with the milling cutter, the metal collar having an outer surface with a taper that tapers from second end to first end, the taper configured to allow access by the metal collar and the milling cutter to the elongated recessed region.

11. An apparatus comprising:

a housing having a first end, a second end, and a number of dimensions configured to reduce vibrations of a tool during a machining operation via insertion of the tool into the housing via temperature alteration, the tool comprising an elongate milling cutter; and an inner cylinder concentric with and extending through the housing from the first end to the second end, the inner cylinder configured to receive the tool at the first end and is configured to a engage a tool holder at the second end, the inner cylinder firmly fitting the tool;

wherein the housing, the tool holder, and the tool are shaped to enter a recessed region of a workpiece, a length and an outer diameter of the housing configured such that vibration of the tool during the machining operation is reduced by shortening an unsupported length of the tool; and wherein a diameter of the second end of the housing is equal to or less than a diameter of the tool holder, and wherein the housing tapers from the second end proximate the tool holder to the first end.

12. The apparatus of claim 11, further comprising:

an outer surface extending from the second end to the first end, wherein the second end is an inner radial position adjacent to the tool holder, wherein the outer surface tapers from the second end to the first end, and wherein the first end is an outer radial position coexistent with an exterior surface of the housing for engaging a machining area on a workpiece.

13. The apparatus of claim 11, wherein the housing and the inner cylinder form a collar and further comprise:

the tool holder; and a spindle system connected to the tool holder, wherein the spindle is configured to rotate the tool holder.

14. The apparatus of claim 11, wherein the tool is a cutter.

15. The apparatus of claim 11, further comprising:

a machining apparatus and a spindle system, wherein the spindle system is located in the machining apparatus.

16. The apparatus of claim 11, wherein the housing has the length and a surface in which the surface of the housing is defined by an outer diameter that decreases from the second end to the first end.

17. The apparatus of claim 11, wherein the length and the outer diameter of the housing are selected such that vibration of the tool during the machining operation is reduced.

18. The apparatus of claim 11, wherein the housing has a cross section with a shape selected from one of a circle, a triangle, a regular polygon, a hexagon, or a pentagon.

19. The apparatus of claim 11, wherein the housing has a surface that tapers from the second end to the first end.

20. The apparatus of claim 11, wherein an inner diameter of the inner cylinder is less than an outer diameter of the tool.

21. The apparatus of claim 11, wherein the apparatus is flush against the tool holder.

22. The apparatus of claim 11, wherein the housing is located along the length of the tool.

23. The apparatus of claim 11, wherein the housing shortens the unsupported length of the tool.

24. An apparatus comprising:

a metal housing having a first end, a second end, a length, an outer diameter, and an exterior surface, the length and the outer diameter of the metal housing selected such that vibration of a tool during a machining operation is reduced by shortening an unsupported length of the tool, the tool comprising an elongate milling cutter, and the metal housing having a substantially circular cross section;

an inner cylindrical portion extending through the metal housing from the first end to the second end in which the inner cylindrical portion is configured to receive a tool at the first end and is configured to engage a tool holder at the second end in which an inner diameter of the inner cylindrical portion is less than an outer diameter of the tool, and the metal housing and the inner cylindrical portion forming a collar and further comprising:

the tool holder in which the apparatus is flush against the tool holder;

a spindle system connected to the tool holder in which the spindle is configured to rotate the tool holder;

a machining apparatus in which the spindle system is located in the machining apparatus; and wherein the exterior surface extends from the second end to the first end, the second end being an inner radial position adjacent to the tool holder, the exterior surface tapering from the second end to the first end, and the first end being an outer radial position coexistent with an exterior surface of the metal housing;

wherein the metal housing, the tool holder, and the tool are shaped to enter into a recessed region of a workpiece; and wherein a diameter of the second end of the metal housing is equal to or less than a diameter of the tool holder.

* * * * *